(12) United States Patent
Kouda

(10) Patent No.: US 10,596,860 B2
(45) Date of Patent: Mar. 24, 2020

(54) PNEUMATIC TIRE

(71) Applicant: The Yokohama Rubber Co., LTD., Minato-ku, Tokyo (JP)

(72) Inventor: Hiraku Kouda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 392 days.

(21) Appl. No.: 15/125,530

(22) PCT Filed: Dec. 24, 2015

(86) PCT No.: PCT/JP2015/086096
§ 371 (c)(1),
(2) Date: Sep. 12, 2016

(87) PCT Pub. No.: WO2016/117273
PCT Pub. Date: Jul. 28, 2016

(65) Prior Publication Data
US 2018/0170120 A1    Jun. 21, 2018

(30) Foreign Application Priority Data
Jan. 19, 2015 (JP) .................................. 2015-007766

(51) Int. Cl.
*B60C 17/00* (2006.01)
*B60C 13/00* (2006.01)
(Continued)

(52) U.S. Cl.
CPC ........ *B60C 17/0009* (2013.01); *B60C 9/0042* (2013.01); *B60C 9/0292* (2013.01); *B60C 9/08* (2013.01); *B60C 13/003* (2013.01)

(58) Field of Classification Search
CPC . B60C 17/0009; B60C 13/003; B60C 13/004; B60C 9/0292
See application file for complete search history.

(56) References Cited

U.S. PATENT DOCUMENTS 2,572,259 A * 10/1951 Gottschall ............... B60C 13/04
152/523
5,299,615 A * 4/1994 Ataka ..................... B60C 13/00
152/454
(Continued)

FOREIGN PATENT DOCUMENTS

CN         1830694       9/2006
JP      2000-289409    10/2000
(Continued)

OTHER PUBLICATIONS

International Search Report for International Application No. PCT/JP2015/086096 dated Mar. 15, 2016, 4 pages, Japan.

*Primary Examiner* — Robert C Dye
(74) *Attorney, Agent, or Firm* — Thorpe North & Western

(57) ABSTRACT

A pneumatic tire includes a reinforcing rubber layer disposed in the sidewall portions and having a crescent-like meridian cross-section; wherein when the tire is assembled on a regular rim and in an unloaded state with an internal pressure of 0 kPa, a radius of curvature (RP) is larger than a radius of curvature (RO), an arc of the radius of curvature (RP) joining an intersection (Pa) of a carcass layer and a straight line (La), an intersection (Pb) of the carcass layer and a straight line (Lb), and an intersection (Pc) of the carcass layer and a straight line (Lc), and an arc of the radius of curvature (RO) joining an intersection (Oa) of the straight line (La) and a tire external contour, an intersection (Ob) of the straight line (Lb) and the tire external contour, and an intersection (Oc) of the straight line (Lc) and the tire external contour.

11 Claims, 4 Drawing Sheets

(51) Int. Cl.
*B60C 9/08* (2006.01)
*B60C 9/02* (2006.01)
*B60C 9/00* (2006.01)

(56) References Cited

U.S. PATENT DOCUMENTS

| | | | |
|---|---|---|---|
| 2001/0001971 A1* | 5/2001 | Cottrell | B60C 15/0018 |
| | | | 152/516 |
| 2002/0000279 A1* | 1/2002 | Tobino | B60C 15/0045 |
| | | | 152/516 |
| 2003/0116249 A1 | 6/2003 | Tobino et al. | |
| 2003/0196738 A1* | 10/2003 | Kobayashi | B60C 15/0018 |
| | | | 152/517 |
| 2006/0201599 A1 | 9/2006 | Tanaka | |

FOREIGN PATENT DOCUMENTS

| | | |
|---|---|---|
| JP | 2001-322410 | 11/2001 |
| JP | 2007-069890 | 3/2007 |
| JP | 2011-057068 | 3/2011 |
| WO | WO 2014/174755 | 10/2014 |

* cited by examiner

|  | Conventional Example 1 | Working Example 1 | Working Example 2 | Working Example 3 | Working Example 4 | Working Example 5 | Working Example 6 | Working Example 7 | Working Example 8 | Working Example 9 | Working Example 10 | Working Example 11 | Working Example 12 |
|---|---|---|---|---|---|---|---|---|---|---|---|---|---|
| Larger of RO and RP | Equal | RP | RP | RP | RP | RP | RP | RP | RP | RP | RP | RP | RP |
| RP/RO | 1.0 | 1.1 | 1.1 | 1.2 | 1.3 | 1.8 | 1.8 | 1.8 | 1.8 | 1.8 | 1.8 | 1.8 | 1.8 |
| Dimensions of RP (mm) | 55 | 55 | 130 | 55 | 55 | 120 | 80 | 80 | 80 | 80 | 80 | 80 | 80 |
| Larger of Aip and Apo | Equal | Equal | Equal | Equal | Equal | Equal | Equal | Aip | Aip | Aip | Aip | Aip | Aip |
| Aip/Apo | 1.0 | 1.0 | 1.0 | 1.0 | 1.0 | 1.0 | 1.0 | 1.5 | 6.0 | 3.0 | 5.0 | 4.0 | 4.0 |
| Dimensions of Aip (mm) | 4.0 | 4.0 | 4.0 | 4.0 | 4.0 | 4.0 | 4.0 | 5.0 | 12.0 | 7.0 | 10.0 | 8.0 | 8.0 |
| (Aip/Apo)/(Bip/Bpo) | 1.0 | 1.0 | 1.0 | 1.0 | 1.0 | 1.0 | 1.0 | 3.0 | 3.0 | 3.0 | 3.0 | 3.0 | 3.0 |
| Carcass cords | Rayon | Rayon | Rayon | Rayon | Rayon | Rayon | Rayon | Rayon | Rayon | Rayon | Rayon | Rayon | Polyester |
| Run-flat durability performance | 100 | 103 | 103 | 103 | 103 | 104 | 104 | 104 | 106 | 106 | 108 | 107 | 105 |
| Steering stability performance | 100 | 102 | 103 | 103 | 105 | 105 | 104 | 106 | 106 | 106 | 108 | 107 | 105 |
| Rolling resistance reduction performance | 100 | 103 | 102 | 103 | 103 | 100 | 102 | 103 | 100 | 103 | 100 | 102 | 103 |

FIG. 3

| | Conventional Example 2 | Working Example 13 | Working Example 14 | Working Example 15 | Working Example 16 | Working Example 17 | Working Example 18 | Working Example 19 | Working Example 20 | Working Example 21 | Working Example 22 | Working Example 23 |
|---|---|---|---|---|---|---|---|---|---|---|---|---|
| Larger of RO and RP | Equal | RP | RP | RP | RP | RP | RP | RP | RP | RP | RP | RP |
| RP/RO | 1.0 | 1.1 | 1.1 | 1.2 | 1.3 | 1.8 | 1.8 | 1.8 | 1.8 | 1.8 | 1.8 | 1.8 |
| Dimensions of RP (mm) | 55 | 55 | 130 | 55 | 55 | 120 | 80 | 80 | 80 | 80 | 80 | 80 |
| Larger of Aip and Apo | Equal | Equal | Equal | Equal | Equal | Equal | Equal | Apo | Apo | Apo | Apo | Apo |
| Aip/Apo | 1.0 | 1.0 | 1.0 | 1.0 | 1.0 | 1.0 | 1.0 | 0.4 | 0.5 | 0.9 | 0.7 | 0.7 |
| Dimensions of Aip (mm) | 10.0 | 10.0 | 10.0 | 10.0 | 10.0 | 10.0 | 10.0 | 6.0 | 3.0 | 9.0 | 6.0 | 6.0 |
| (Aip/Apo)/(Bip/Bpo) | 1.0 | 1.0 | 1.0 | 1.0 | 1.0 | 1.0 | 1.0 | 3.0 | 3.0 | 3.0 | 3.0 | 3.0 |
| Carcass cords | Rayon | Rayon | Rayon | Rayon | Rayon | Rayon | Rayon | Rayon | Rayon | Rayon | Rayon | Polyester |
| Run-flat durability performance | 100 | 105 | 105 | 105 | 105 | 106 | 106 | 104 | 102 | 106 | 105 | 103 |
| Steering stability performance | 100 | 102 | 103 | 103 | 105 | 105 | 104 | 103 | 102 | 104 | 104 | 102 |
| Rolling resistance reduction performance | 100 | 100 | 99 | 100 | 100 | 99 | 101 | 106 | 107 | 102 | 105 | 106 |

FIG. 4

PNEUMATIC TIRE

TECHNICAL FIELD

The present technology relates to a pneumatic tire capable of run-flat travel.

BACKGROUND ART

Pneumatic tires are assembled on rims, inflated with air, and mounted on a vehicle. When a vehicle is traveling, it is this internal air pressure that bears the load. However upon puncture or the like, air escapes from the pneumatic tire, rendering the tire unsuitable to bear the load. Specifically, the load supported by the air pressure becomes supported by the sidewall portions, causing the sidewall portions to greatly deform. As a result, travel is impeded.

Pneumatic tires are known that take into account such issues. Such tires are capable of run-flat travel (traveling in a deflated state due to a puncture or the like) and are provided with a reinforcing rubber layer to the inside of the sidewall portions which increases the flexural rigidity of the sidewall portions. In other words, deformation of the sidewall portions of such pneumatic tires is suppressed, allowing the pneumatic tire to travel even in a state in which some of the air inflating the pneumatic tire has escaped and a large load is borne by the sidewall portions.

Conventional tires, such as the pneumatic tire described in Japanese Unexamined Patent Application Publication No. 2000-289409, have an object of improving the performance of run-flat travel by improving a sectional shape of the tire to obtain an optimal sectional shape by which maximum stress applied to the tire can be reduced while minimizing increase in tire weight. This pneumatic tire satisfies the following expressions:

$$Ra/D \leq 0.08;$$

$$Rb/D \leq 0.08;$$

$$0 < \varphi a \leq 50 \text{ deg.; and}$$

$$0 < \varphi b \leq 50 \text{ deg.;}$$

where, in a tire meridional section in a standard state in which the tire is mounted on a standard wheel rim, inflated to a standard inner pressure, and not loaded, Ra is a radius of curvature of a first arc having a center Oa on a tire axial direction line X passing through a midpoint between a first point A and a second point B and on a tire inner cavity side and in contact with a tire center line at the first point A, the first point A being a point where a tire radial direction line Y passing through a wheel rim width position of the standard wheel rim intersects the tire center line passing through a midpoint of a thickness of the tire on a tread portion side and a second point B being a point where the tire radial direction line Y intersects the tire center line on a bead portion side, Rb is a radius of curvature of a second arc having a center Ob on the tire axial direction line X and on the tire inner cavity side and in contact with the tire center line at the second point B, $\varphi a$ is an angle formed by the tire axial direction line X and a straight line Oa-A connecting the center Oa and the first point A, $\varphi b$ is an angle formed by the tire axial direction line X and a straight line Ob-B connecting the center Ob and the second point B, and D is an outer diameter of the tire in the standard state.

However, though the steering stability performance of pneumatic tires capable of run-flat travel can be increased by increasing the thickness of the reinforcing rubber layer in the tire width direction to increase the vertical stiffness in the tire radial direction, such an increase in the thickness of the reinforcing rubber layer leads to an increase in the volume of the reinforcing rubber layer, which tends to cause an increase in rolling resistance. On the other hand, reducing the thickness of the reinforcing rubber in the tire width direction to reduce rolling resistance tends to cause a decrease in durability performance when run-flat traveling (run-flat durability performance).

SUMMARY

The present technology provides a pneumatic tire with both good run-flat durability performance and steering stability performance.

A first example pneumatic tire of the present technology comprises:

a reinforcing rubber layer disposed in the sidewall portions on both sides in a tire width direction, the reinforcing rubber layer having a substantially crescent-like meridian cross-section; wherein when the tire is assembled on a regular rim and in an unloaded state with an internal pressure of 0 kPa, a radius of curvature RP is larger than a radius of curvature RO, an arc of the radius of curvature RP joining an intersection Pa of a carcass layer and a straight line La, an intersection Pb of the carcass layer and a straight line Lb, and an intersection Pc of the carcass layer and a straight line Lc, and an arc of the radius of curvature RO joining an intersection Oa of the straight line La and a tire external contour, an intersection Ob of the straight line Lb and the tire external contour, and an intersection Oc of the straight line Lc and the tire external contour, where the straight line Lc is a straight line orthogonal to a tire equatorial plane at a portion of the tire with a maximum width when viewed in a meridian cross section, the straight line La is a straight line from an intersection of the straight line Lc and the tire equatorial plane inclined by 10° outward in a tire radial direction with respect to the straight line Lc, and the straight line Lb is a straight line from the intersection of the straight line Lc and the tire equatorial plane inclined by 10° inward in the tire radial direction with respect to the straight line Lc.

The radius of curvature RO of the arc that joins the intersections Oa, Ob, Oc of the straight lines La, Lb, Lc and the tire external contour is, in other words, the radius of curvature of the tire external contour. The radius of curvature RP of the arc that joins the intersections Pa, Pb, Pc of the straight lines La, Lb, Lc and the carcass layer is, in other words, the radius of curvature of the carcass layer. According to the pneumatic tire in which the radius of curvature RP of the carcass layer is greater than the radius of curvature RO of the tire external contour, tensile strength in the tire radial direction of the carcass layer tends to increase and vertical stiffness, i.e. elasticity in the tire radial direction, increases. As a result, both good run-flat durability performance and steering stability performance can be obtained without increasing the cross-sectional thickness of the reinforcing rubber layer, which contributes to enabling run-flat travel. Moreover, by removing the need to increase the cross-sectional thickness of the reinforcing rubber layer, which contributes to enabling run-flat travel, degradation of the rolling resistance can be reduced or prevented. As a result, both good run-flat durability performance and steering stability performance can be obtained without the rolling resistance being degraded.

A second example of the pneumatic tire is that of the first example, wherein a relationship between the radius of curvature RO and the radius of curvature RP satisfies: RO×1.2≤RP≤RO×2.5.

If the radius of curvature RP of the carcass layer is less than 1.2 times the radius of curvature RO of the tire external contour, the improvements in the run-flat durability performance due to an increase in vertical stiffness are insignificant. If the radius of curvature RP of the carcass layer is greater than 2.5 times the radius of curvature RO of the tire external contour, the increase in vertical stiffness is excessive and rolling resistance tends to increase. Accordingly, by satisfying the relationship RO×1.2≤RP≤RO×2.5 of the radii of curvature RO, RP, improvements in the run-flat durability performance can be significant and increases in rolling resistance can be significantly prevented.

The pneumatic tire of the third example is that of the first or second examples, wherein the radius of curvature RP is from 60 mm to 120 mm, both inclusive.

If the radius of curvature RP of the carcass layer is less than 60 mm, the improvements in the run-flat durability performance due to an increase in vertical stiffness are insignificant. If the radius of curvature RP of the carcass layer is greater than 120 mm, the increase in vertical stiffness is excessive and rolling resistance tends to increase. Accordingly, by the radius of curvature RP of the carcass layer being from 60 mm to 120 mm, both inclusive, improvements in the run-flat durability performance can be significant and increases in rolling resistance can be significantly prevented.

The pneumatic tire of the fourth example is that of any one of the first to third examples, wherein a relationship between a cross-sectional width Aip and a cross-sectional width Apo satisfies: Apo<Aip, where the cross-sectional width Aip is a cross-sectional width from an intersection Ia of the straight line La and a tire internal contour to the intersection Pa of the straight line La and the carcass layer, within which the reinforcing rubber layer is disposed, and the cross-sectional width Apo is a cross-sectional width from the intersection Pa to the intersection Oa of the straight line La and the tire external contour.

According to this pneumatic tire, by the cross-sectional width Aip being greater than the cross-sectional width Apo, the volume of the reinforcing rubber layer within the cross-sectional width Aip becomes relatively large, thus enabling significant improvements in the run-flat durability performance to be obtained.

The pneumatic tire of the fifth example is that of the fourth example, wherein the relationship between the cross-sectional width Aip and the cross-sectional width Apo satisfies: Apo×1.5≤Aip≤Apo×6.0, and the cross-sectional width Aip is from 5.0 mm to 12.0 mm, both inclusive.

If the relationship Apo<Aip is such that the cross-sectional width Aip within which the reinforcing rubber layer is disposed is less than 1.5 times the cross-sectional width Apo, improvements in the run-flat durability performance are insignificant. If the cross-sectional width Aip is greater than 6.0 times the cross-sectional width Apo, the increase in volume of the reinforcing rubber layer is excessive and rolling resistance increases. If the cross-sectional width Aip is less than 5.0 mm, improvements in the run-flat durability performance are insignificant. If the cross-sectional width Aip is greater than 12.0 mm, the increase in volume of the reinforcing rubber layer is excessive and rolling resistance increases. Accordingly, by the cross-sectional widths Aip, Apo having a relationship such that Apo×1.5≤Aip≤Apo×6.0 and the cross-sectional width Aip being from 5.0 mm to 12.0 mm, both inclusive, improvements in the run-flat durability performance can be significant and increases in rolling resistance can be significantly prevented.

The pneumatic tire of the sixth example is that of any one of the first to third examples, wherein a relationship between a cross-sectional width Aip and a cross-sectional width Apo satisfies: Aip<Apo, where the cross-sectional width Aip is a cross-sectional width from an intersection Ia of the straight line La and a tire internal contour to the intersection Pa of the straight line La and the carcass layer, within which the reinforcing rubber layer is disposed, and the cross-sectional width Apo is a cross-sectional width from the intersection Pa to the intersection Oa of the straight line La and the tire external contour.

According to this pneumatic tire, by the cross-sectional width Aip being less than the cross-sectional width Apo, the volume of the reinforcing rubber layer within the cross-sectional width Aip becomes relatively small, thus enabling the rolling resistance to be decreased.

The pneumatic tire of the seventh example is that of the sixth example, wherein the relationship between the cross-sectional width Aip and the cross-sectional width Apo satisfies: Apo×0.5≤Aip≤Apo×0.9, and the cross-sectional width Aip is from 3.0 mm to 9.0 mm, both inclusive.

If the relationship Aip<Apo is such that the cross-sectional width Aip within which the reinforcing rubber layer is disposed is less than 0.5 times the cross-sectional width Apo, improvements in the run-flat durability performance are insignificant. If the cross-sectional width Aip is greater than 0.9 times the cross-sectional width Apo, the increase in volume of the reinforcing rubber layer is excessive and rolling resistance increases. If the cross-sectional width Aip is less than 3.0 mm, improvements in the run-flat durability performance are insignificant. If the cross-sectional width Aip is greater than 9.0 mm, the increase in volume of the reinforcing rubber layer is excessive and rolling resistance increases. Accordingly, by the cross-sectional widths Aip, Apo having a relationship such that Apo×0.5≤Aip≤Apo×0.9 and the cross-sectional width Aip being from 3.0 mm to 9.0 mm, both inclusive, improvements in the run-flat durability performance can be significant and increases in rolling resistance can be significantly prevented.

The pneumatic tire of the eighth example is that of any one of the first to seventh examples, wherein a relationship between the cross-sectional width Aip, the cross-sectional width Apo, a cross-sectional width Bip, and a cross-sectional width Bpo satisfies: Bip/Bpo<Aip/Apo≤Bip/Bpo×5.0, where the cross-sectional width Aip is the cross-sectional width from the intersection Ia of the straight line La and the tire internal contour to the intersection Pa of the straight line La and the carcass layer, within which the reinforcing rubber layer is disposed, the cross-sectional width Apo is the cross-sectional width from the intersection Pa to the intersection Oa of the straight line La and the tire external contour, the cross-sectional width Bip is a cross-sectional width from an intersection Ib of the straight line Lb and the tire internal contour to the intersection Pb of the straight line Lb and the carcass layer, within which the reinforcing rubber layer is disposed, and the cross-sectional width Bpo is a cross-sectional width from the intersection Pb to the intersection Ob of the straight line Lb and the tire external contour.

If Bip/Bpo is a greater value than Aip/Apo, the volume of the reinforcing rubber layer is decreased overall, thus improvements in the run-flat durability performance are insignificant. If Aip/Apo is more than 5.0 times Bip/Bpo, the volume of the reinforcing rubber layer to the outer side in the tire radial direction becomes relatively large and rigidity is excessive, thus increasing rolling resistance. Accordingly, by the cross-sectional widths Aip, Apo, Bip, Bpo having a relationship such that Bip/Bpo<Aip/Apo≤Bip/Bpo×5.0, improvements in the run-flat durability performance can be significant and increases in rolling resistance can be significantly prevented.

The pneumatic tire of the ninth example is that of any one of the first to eighth examples, wherein carcass cords of the carcass layer are made from rayon.

According to the pneumatic tire, by using rayon, which is a fiber that is relatively light weight and has relatively high tensile strength, for the carcass cords of the carcass layer, the tensile strength in the tire radial direction of the carcass layer enables significant improvements in the run-flat durability performance to be obtained.

The pneumatic tire according to the present technology is capable of both good run-flat durability performance and steering stability performance without the rolling resistance being degraded.

BRIEF DESCRIPTION OF DRAWINGS

FIG. 3 is a table showing results of performance tests of pneumatic tires according to working examples of the present technology.

FIG. 4 is a table showing results of performance tests of pneumatic tires according to working examples of the present technology.

DETAILED DESCRIPTION

An embodiment of the present technology is described in detail below with reference to the drawings. However, the present technology is not limited by the embodiment. Furthermore, components of the embodiment include components that may be easily replaced by those skilled in the art or that are substantially identical to components of the embodiment. Furthermore, a plurality of modified examples described in the embodiment may be combined as desired within the scope apparent to those skilled in the art.

Figure 1:
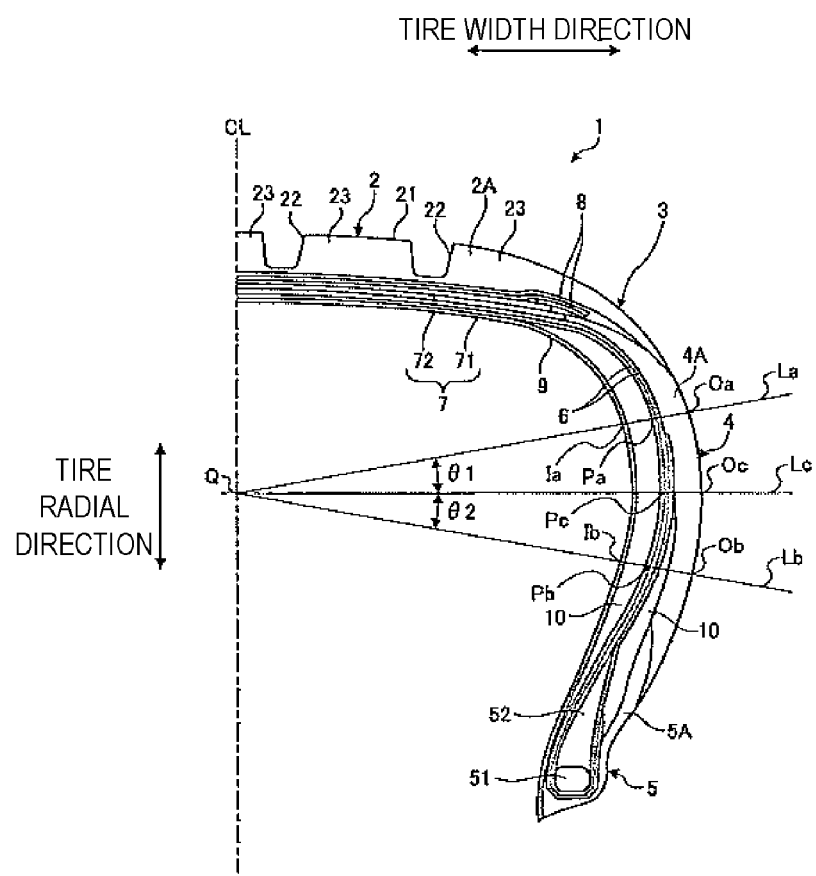
FIG. 1 is a meridian cross-sectional view of a pneumatic tire according to an embodiment of the present technology.
Figure 2:
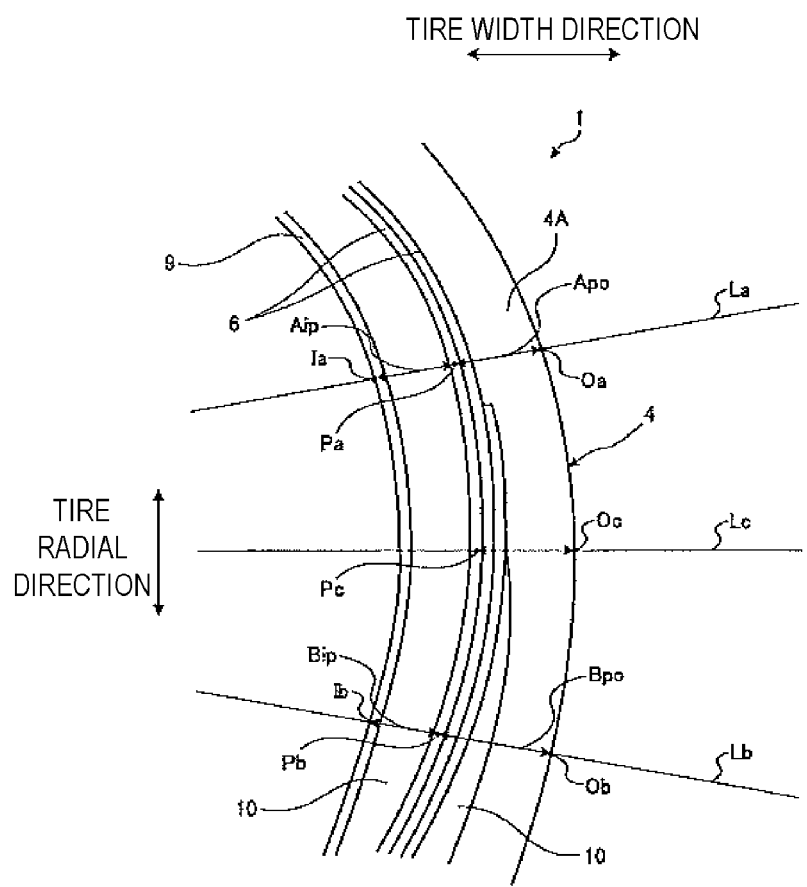
FIG. 2 is an enlarged meridian cross-sectional view of a portion of the pneumatic tire according to this embodiment of the present technology.

FIG. 1 is a meridian cross-sectional view of a pneumatic tire according to the present embodiment. FIG. 2 is an enlarged meridian cross-sectional view of a portion of the pneumatic tire according to the present embodiment.

In the following description, "tire radial direction" refers to a direction orthogonal to the rotational axis (not illustrated) of a pneumatic tire 1. "Inward in the tire radial direction" refers to a side approximate to the rotational axis in the tire radial direction, and "outward in the tire radial direction" refers to the side distanced from the rotational axis in the tire radial direction. "Tire circumferential direction" refers to a circumferential direction taking the rotational axis as a center axis. In addition, "tire width direction" refers to a direction parallel to the rotational axis. "Inward in the tire width direction" refers to a side approximate to a tire equatorial plane CL (tire equatorial line) in the tire width direction, and "outward in the tire width direction" refers to a side distanced from the tire equatorial plane CL in the tire width direction. "Tire equatorial plane CL" refers to a plane that is orthogonal to the rotational axis of the pneumatic tire 1 and that passes through the center of the pneumatic tire 1 in the tire width direction. "Tire width" is a width in the tire width direction between components located outward in the tire width direction, or in other words, the distance between the components that are most distant in the tire width direction from the tire equatorial plane CL. "Tire equatorial line" refers to a line along the tire circumferential direction of the pneumatic tire 1 that lies on the tire equatorial plane CL. In the present embodiment, the tire equatorial line uses the same reference sign CL as the tire equatorial plane. In addition, the pneumatic tire 1 described below has an essentially symmetric structure with respect to the tire equatorial plane CL. Thus for the sake of description, the pneumatic tire 1 is illustrated in the meridian cross-sectional view (FIG. 1) taken along a plane passing through a rotational axis of the pneumatic tire 1 and described in reference to the structure on only one side (the right side in FIG. 1) of the tire equatorial plane CL. A description of the other side (left side in FIG. 1) is omitted.

As illustrated in FIG. 1, the pneumatic tire 1 of the present embodiment includes a tread portion 2, shoulder portions 3 on both sides of the tread portion 2. The pneumatic tire 1 further includes sidewall portions 4 and bead portions 5 disposed in that order from the shoulder portion 3. The pneumatic tire 1 also includes a carcass layer 6, a belt layer 7, a belt reinforcing layer 8, an innerliner layer 9, and a reinforcing rubber layer 10.

The tread portion 2 is made of tread rubber 2A, is exposed on the outermost side in the tire radial direction of the pneumatic tire 1, and the surface thereof constitutes the contour of the pneumatic tire 1. A tread surface 21 is formed on an outer peripheral surface of the tread portion 2, in other words, on a road contact surface that comes in contact with a road surface during traveling. The tread surface 21 is provided with a plurality (four in the present embodiment) of main grooves 22 that extend in the tire circumferential direction. The main grooves 22 are straight main grooves parallel to the tire equatorial line CL. Moreover, a plurality of rib-like land portions 23 that extend in the tire circumferential direction are formed in the tread surface 21 defined by the plurality of main grooves 22. Note that the main grooves 22 may extend in the tire circumferential direction in a bending or curving manner. Additionally, lug grooves that extend in a direction that intersects the tire circumferential direction are provided in the land portions 23 of the tread surface 21. The lug grooves may intersect the main grooves 22. Alternatively, the lug grooves may have one end that does not intersect the main groove 22 and terminates within a land portion 23. In the case of the lug grooves having both ends intersect the main grooves 22, the land portions 23 are formed into a plurality of block-like land portions divided in the tire circumferential direction. Note that the lug grooves may extend inclined with respect to the tire circumferential direction in a bending or curving manner.

The shoulder portions 3 are regions on the outer sides of the tread section 2 in the tire width direction. In other words, the shoulder portions 3 are made of the tread rubber 2A. Additionally, the sidewall portions 4 are exposed on the outermost sides of the pneumatic tire 1 in the tire width direction. The sidewall portions 4 are made of sidewall rubber 4A. The bead portions 5 each include a bead core 51 and a bead filler 52. The bead core 51 is formed by winding a bead wire, which is a steel wire, into an annular shape. The bead filler 52 is a rubber material that is disposed in space formed by an end of the carcass layer 6 in the tire width direction being folded back at the position of the bead core 51. The bead portions 5 each include an outwardly exposed rim cushion rubber 5A that comes into contact with the rim (not illustrated). The rim cushion rubber 5A constitutes the outer periphery of the bead portion 5. The rim cushion rubber 5A is disposed from a position inward of the bead portion 5 all the way up to a position covering the outwardly disposed bead filler 52 (sidewall portion 4), passing over the lower end portion of the bead portion 5.

The ends of the carcass layer 6 in the tire width direction are folded over the pair of bead cores 51 from the inner side in the tire width direction outward in the tire width direction, and the carcass layer 6 is stretched in a toroidal shape in the tire circumferential direction to form the framework of the tire. The carcass layer 6 is constituted by a plurality of coating-rubber-covered carcass cords (not illustrated) disposed in the tire circumferential direction, parallel to each other, along a tire meridian direction at a given angle with respect to the tire circumferential direction. The carcass cords are made of organic fibers (e.g., polyester, rayon, nylon, or the like). The carcass layer 6 is provided with at least one layer, and in the present embodiment, two layers. As illustrated in FIG. 1, the end portion of the inner layer of the two carcass layers 6 extends to the sidewall portion 4 covering all of the bead filler 52, whereas the end portion of the outer layer extends to a position at which the bead filler 52 is only partially covered.

The belt layer 7 has a multi-layer structure in which at least two layers (belts 71 and 72) are layered. The belt layer 7 is disposed in the tread portion 2 outward in the tire radial direction, corresponding to the outer periphery of the carcass layer 6, and covers the carcass layer 6 in the tire circumferential direction. The belts 71 and 72 include a plurality of coating-rubber-covered cords (not illustrated) disposed parallel at a predetermined angle with respect to the tire circumferential direction (e.g., from 20 degrees to 30 degrees). The cords are made of steel or organic fibers (polyester, rayon, nylon, or the like). Moreover, the belts 71 and 72 overlap each other and are disposed so that the cords of the respective belts intersect each other.

The belt reinforcing layer 8 is disposed outward in the tire radial direction, corresponding to the outer periphery of the belt layer 7, and covers the belt layer 7 in the tire circumferential direction. The belt reinforcing layer 8 includes a plurality of coating-rubber-covered cords (not illustrated) disposed parallel in the tire width direction and substantially parallel (±5 degrees) to the tire circumferential direction. The cords are made of steel or organic fibers (polyester, rayon, nylon, or the like). The belt reinforcing layer 8 illustrated in FIG. 1 includes one layer covering all of the belt layer 7 and one layer covering the end portion of the belt layer 7 in the tire width direction. The configuration of the belt reinforcing layer 8 is not limited to that described above. While not illustrated in the drawings, a configuration may be used in which, for example, two layers are disposed covering all of the belt layer 7, or two layers are disposed covering only the end portion of the belt layer 7 in the tire width direction. In addition, while not illustrated in the drawings, a configuration of the belt reinforcing layer 8 may be used in which, for example, one layer is disposed covering all of the belt layer 7, or one layer is disposed covering only the end portion of the belt layer 7 in the tire width direction. In other words, the belt reinforcing layer 8 overlaps at least the end portion of the belt layer 7 in the tire width direction. Additionally, the belt reinforcing layer 8 is provided by winding band-like strip material (e.g. having a width of 10 mm) in the tire circumferential direction.

The innerliner layer 9 is the tire inner surface, i.e. the inner peripheral surface of the carcass layer 6. Both ends of the innerliner layer 9 in the tire width direction reach the bead cores 51 of the bead portions 5 and extend in the tire circumferential direction in a toroidal shape. The innerliner layer 9 prevents air molecules from escaping from the tire. Note that, as illustrated in FIG. 1, the innerliner layer 9 may be disposed extending inward of the bead portion 5. However, the innerliner layer 9 may be disposed extending to the lower portion (inward in the tire radial direction) of the bead core 51.

The reinforcing rubber layer 10 is disposed within the sidewall portion 4 not inwardly or outwardly exposed. The reinforcing rubber layer 10 is mainly provided between the carcass layer 6 and the innerliner layer 9 corresponding to the inner side of the carcass layer 6, and has a crescent shaped meridian cross-section. The reinforcing rubber layer 10 is formed of rubber material that has a strength greater than that of the rim cushion rubber 5A of the bead portions 5 or that of the sidewall rubber 4A of the sidewall portions 4. The reinforcing rubber layer 10 may be formed of differing rubber material and may be disposed between the carcass layer 6 and the sidewall rubber 4A and rim cushion rubber 5A corresponding to the tire outer side of the carcass layer 6 as illustrated in FIG. 1.

The pneumatic tire 1 is mounted on a vehicle (not illustrated) with the bead portions 5 assembled on the rim and being inflated to a predetermined air pressure. When the vehicle travels, the tread surface 21 comes into contact with the road surface while the pneumatic tire 1 rotates. When the vehicle is travelling, because the tread surface 21 comes into contact with the road surface as described above, a load including the weight of the vehicle is borne by the tread surface 21. In the case of the tread surface 21 bearing such a load, the pneumatic tire 1 elastically deforms in a manner governed by the nature of the load and hardness of the parts of the tire, and the air the tire is inflated with acts on the inside of the tire to expand the tire in the outward direction. This resilient force due to the air the tire is inflated with prevents excessive deformation of the pneumatic tire 1, even when the tread surface 21 bears a load. Accordingly, the pneumatic tire 1 can rotate while bearing a load, thus allowing the vehicle to travel.

Though the pneumatic tire 1 does not readily deform due to the air pressure of the air the tire is inflated with, while the vehicle is traveling, a foreign material may pierce the tread surface 21 and cause a puncture, for example, thus causing air from inside the pneumatic tire 1 to escape. When air from inside the pneumatic tire 1 escapes, the resilient force due to the air acting on the inside of the pneumatic tire 1 to expand the pneumatic tire 1 outward decreases in strength. When a load is borne by the tread surface 21 of the deflated pneumatic tire 1, the tire-radial-direction load is borne by the sidewall portions 4. As a result, the sidewall portions 4 are susceptible to elastic deformation in the tire radial direction. However, these sidewall portions 4 are provided with the reinforcing rubber layers 10. As described above, the reinforcing rubber layer 10 is formed of rubber material with a strength greater than that of the sidewall rubber 4A of the sidewall portions 4. Accordingly, the reinforcing rubber layer 10 suppresses deformation of the sidewall portions 4 in the tire radial direction when the sidewall portions 4 bear a tire-radial-direction load. As a result, the pneumatic tire 1, by virtue of the reinforcing rubber layer 10 suppressing deformation of the sidewall portions 4 in the tire radial direction, enables travel of the vehicle or run-flat travel (travel with the pneumatic tire 1 in a deflated state).

When such a pneumatic tire 1 capable of run-flat travel is assembled on a regular rim and in an unloaded state with an internal pressure of 0 kPa, a straight line orthogonal to the tire equatorial plane CL at the portion of the tire with the maximum width when viewed in a meridian cross-section is taken as straight line Lc. Additionally, a straight line from an intersection Q of the straight line Lc and the tire equatorial plane CL inclined outward in the tire radial direction by an angle θ1 of 10° with respect to the straight line Lc is taken as straight line La, and a straight line inclined inward in the tire radial direction by an angle θ2 of 10° is taken as straight line Lb. When defined as such, a radius of curvature RP of an arc that joins intersections Pa, Pb, Pc of the respective straight lines La, Lb, Lc with the carcass layer 6 is greater than a radius of curvature RO of an arc that joins intersections Oa, Ob, Oc of the respective straight lines La, Lb, Lc with the tire external contour.

Note that the intersections Pa, Pb, Pc are points where the center of the carcass cords of the most inwardly disposed carcass layer 6 and the respective straight lines La, Lb, Lc intersect.

Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to "maximum air pressure" defined by JATMA, a maximum value given in "tire load limits at various cold inflation pressures" defined by TRA, or "inflation pressures" defined by ETRTO. Note that the "regular load" refers to "maximum load capacity" defined by JATMA, a maximum value given in "tire load limits at various cold inflation pressures" defined by TRA, or "load capacity" defined by ETRTO.

The portion of the tire with the maximum width is the position of the edges of the tire cross-sectional width where the width in the tire width direction is greatest. The tire cross-sectional width of the present embodiment is equal to the maximum overall width of the tire in the tire width direction minus the width of any patterns or letters or the like when the pneumatic tire 1 is assembled onto a regular rim and in an unloaded state with an internal pressure of 0 kPa. In tires provided with a rim protection bar (provided along the tire circumferential direction and projecting outward in the tire width direction) that protects the rim, the rim protection bar is the most outward portion in the tire width direction, but the cross-sectional width as defined in this embodiment excludes the rim protection bar. In addition, "tire external contour" refers to the profile of the pneumatic tire 1 excluding any patterns or letters conforming to the outer surface of the pneumatic tire 1. "Tire internal contour" refers to the profile conforming to the innerliner layer 9, which is the inner surface of the pneumatic tire 1.

The radius of curvature RO of the arc that joins the intersections Oa, Ob, Oc of the straight lines La, Lb, Lc and the tire external contour is, in other words, the radius of curvature of the tire external contour. The radius of curvature RP of the arc that join the intersections Pa, Pb, Pc of the straight lines La, Lb, Lc and the carcass layer 6 is, in other words, the radius of curvature of the carcass layer 6. According to the pneumatic tire 1 in which the radius of curvature RP of the carcass layer 6 is greater than the radius of curvature RO of the tire external contour, tensile strength in the tire radial direction of the carcass layer 6 tends to increase and vertical stiffness, i.e. elasticity in the tire radial direction, increases. As a result, both good run-flat durability performance and steering stability performance can be obtained without increasing the cross-sectional thickness of the reinforcing rubber layer 10, which contributes to enabling run-flat travel. Moreover, by removing the need to increase the cross-sectional thickness of the reinforcing rubber layer 10, which contributes to enabling run-flat travel, degradation in the rolling resistance can be reduced or prevented. As a result, both good run-flat durability performance and steering stability performance can be obtained without the rolling resistance being degraded.

In the pneumatic tire 1 of the present embodiment, the relationship between the radii of curvature RO, RP is such that RO×1.2≤RP≤RO×2.5 is satisfied.

If the radius of curvature RP of the carcass layer 6 is less than 1.2 times the radius of curvature RO of the tire external contour, the improvements in the run-flat durability performance due to an increase in vertical stiffness are insignificant. If the radius of curvature RP of the carcass layer 6 is greater than 2.5 times the radius of curvature RO of the tire external contour, the increase in vertical stiffness is excessive and rolling resistance tends to increase. Accordingly, by satisfying the relationship RO×1.2≤RP≤RO×2.5 of the radii of curvature RO, RP, improvements in the run-flat durability performance are significant and increases in rolling resistance can be significantly prevented. Note that to improve the run-flat durability performance and prevent increases in rolling resistance more significantly, satisfying the relationship RO×1.5≤RP≤RO×2.0 is more preferable.

In the pneumatic tire 1 of the present embodiment, the radius of curvature RP of the carcass layer 6 is preferably from 60 mm to 120 mm, both inclusive.

If the radius of curvature RP of the carcass layer 6 is less than 60 mm, the improvements in the run-flat durability performance due to an increase in vertical stiffness are insignificant. If the radius of curvature RP of the carcass layer 6 is greater than 120 mm, the increase in vertical stiffness is excessive and rolling resistance tends to increase. Accordingly, by the radius of curvature RP of the carcass layer 6 being from 60 mm to 120 mm, both inclusive, improvements in the run-flat durability performance can be significant and increases in rolling resistance can be significantly prevented. Note that to improve the run-flat durability performance and prevent increases in rolling resistance more significantly, the radius of curvature RP of the carcass layer 6 is preferably from 70 mm to 100 mm, both inclusive.

The pneumatic tire 1 of the present embodiment is provided with the reinforcing rubber layer 10 within a cross-sectional width Aip taken from an intersection Ia of the straight line La and the tire internal contour to the intersection Pa of the straight line La and the carcass layer 6. A cross-sectional width Apo is taken from the intersection Pa to the intersection Oa of the straight line La and the tire external contour. When defined as such, in one aspect, the relationship between the cross-sectional width Aip and the cross-sectional width Apo is preferably such that Apo<Aip is satisfied.

According to this pneumatic tire 1, by the cross-sectional width Aip being greater than the cross-sectional width Apo, the volume of the reinforcing rubber layer 10 within the cross-sectional width Aip becomes relatively large, thus enabling significant improvements in the run-flat durability performance to be obtained.

In the pneumatic tire 1 of the present embodiment, the relationship between the cross-sectional widths Aip, Apo is preferably such that Apo×1.5≤Aip≤Apo×6.0 is satisfied, and the cross-sectional width Aip is preferably from 5.0 mm to 12.0 mm, both inclusive.

If the relationship Apo<Aip is such that the cross-sectional width Aip within which the reinforcing rubber layer 10 is disposed is less than 1.5 times the cross-sectional width Apo, improvements in the run-flat durability performance are insignificant. If the cross-sectional width Aip is greater than 6.0 times the cross-sectional width Apo, the increase in volume of the reinforcing rubber layer 10 is excessive and rolling resistance increases. If the cross-sectional width Aip is less than 5.0 mm, improvements in the run-flat durability performance are insignificant. If the cross-sectional width Aip is greater than 12.0 mm, the increase in volume of the reinforcing rubber layer 10 is excessive and rolling resistance increases. Accordingly, by the cross-sectional widths Aip, Apo having a relationship such that Apo×1.5≤Aip≤Apo×6.0 and the cross-sectional width Aip being from 5.0 mm to 12.0 mm, both inclusive, improvements in the run-flat durability performance can be significant and increases in rolling resistance can be significantly prevented. Note that to improve the run-flat durability performance and prevent increases in rolling resistance more significantly, satisfying the relationship Apo×3.0≤Aip≤Apo×5.0 is more preferable and the cross-sectional width Aip is preferably from 7.0 mm to 10.0 mm, both inclusive.

The pneumatic tire 1 of the present embodiment is provided with the reinforcing rubber layer 10 within the cross-sectional width Aip taken from the intersection Ia of the straight line La and the tire internal contour to the intersection Pa of the straight line La and the carcass layer 6. The cross-sectional width Apo is taken from the intersection Pa to the intersection Oa of the straight line La and the tire external contour. When defined as such, in another aspect, the relationship between the cross-sectional width Aip and the cross-sectional width Apo is preferably such that Aip<Apo is satisfied.

According to this pneumatic tire 1, by the cross-sectional width Aip being less than the cross-sectional width Apo, the volume of the reinforcing rubber layer 10 within the cross-sectional width Aip becomes relatively small, thus enabling the rolling resistance to be decreased.

In the pneumatic tire 1 of the present embodiment, the relationship between the cross-sectional widths Aip, Apo is preferably such that Apo×0.5≤Aip≤Apo×0.9 is satisfied, and the cross-sectional width Aip is preferably from 3.0 mm to 9.0 mm, both inclusive.

If the relationship Aip<Apo is such that the cross-sectional width Aip within which the reinforcing rubber layer 10 is disposed is less than 0.5 times the cross-sectional width Apo, improvements in the run-flat durability performance are insignificant. If the cross-sectional width Aip is greater than 0.9 times the cross-sectional width Apo, the increase in volume of the reinforcing rubber layer 10 is excessive and rolling resistance increases. If the cross-sectional width Aip is less than 3.0 mm, improvements in the run-flat durability performance are insignificant. If the cross-sectional width Aip is greater than 9.0 mm, the increase in volume of the reinforcing rubber layer 10 is excessive and rolling resistance increases. Accordingly, by the cross-sectional widths Aip, Apo having a relationship such that Apo×0.5≤Aip≤Apo×0.9 and the cross-sectional width Aip being from 3.0 mm to 9.0 mm, both inclusive, improvements in the run-flat durability performance can be significant and increases in rolling resistance can be significantly prevented.

The pneumatic tire 1 of the present embodiment is provided with the reinforcing rubber layer 10 within the cross-sectional width Aip taken from the intersection Ia of the straight line La and the tire internal contour to the intersection Pa of the straight line La and the carcass layer 6. The cross-sectional width Apo is taken from the intersection Pa to the intersection Oa of the straight line La and the tire external contour. The reinforcing rubber layer 10 is provided within a cross-sectional width Bip taken from an intersection Ib of the straight line Lb and the tire internal contour to the intersection Pb of the straight line Lb and the carcass layer 6. A cross-sectional width Bpo is taken from the intersection Pb to the intersection Ob of the straight line Lb and the tire external contour. When defined as such, the cross-sectional widths Aip, Apo, Bip, Bpo preferably have the relationship such that Bip/Bpo<Aip/Apo≤Bip/Bpo×5.0 is satisfied.

If Bip/Bpo is a greater value than Aip/Apo, the volume of the reinforcing rubber layer 10 is decreased overall, thus improvements in the run-flat durability performance are insignificant. If Aip/Apo is more than 5.0 times greater than the value of Bip/Bpo, the volume of the reinforcing rubber layer 10 to the outer side in the tire radial direction becomes relatively large and rigidity is excessive, thus increasing rolling resistance. Accordingly, by the cross-sectional widths Aip, Apo, Bip, Bpo having a relationship such that Bip/Bpo<Aip/Apo≤Bip/Bpo×5.0, improvements in the run-flat durability performance can be significant and increases in rolling resistance can be significantly prevented.

Additionally, in the pneumatic tire 1 of the present embodiment, the material of the carcass cords of the carcass layer 6 is preferably rayon.

According to the pneumatic tire 1, by using rayon, which is a fiber that is relatively light weight and has relatively high tensile strength, for the carcass cords of the carcass layer 6, the tensile strength in the tire radial direction of the carcass layer 6 enables significant improvements in the run-flat durability performance to be obtained.

EXAMPLES

In the working examples, performance tests were carried out for run-flat durability performance, steering stability performance, and rolling resistance reduction performance on a plurality of types of pneumatic tires under different conditions (see FIG. 3 and FIG. 4).

In the tests, pneumatic tires (test tires) of tire size 235/50R18 assembled on a regular rim of 18×7.5 J were used.

The run-flat durability performance evaluation test was carried out on a test course in accordance with Economic Commission for Europe (ECE) Regulation 30, with the test tires having an internal pressure of 0 kPa. The results for distance travelled were indexed with the results of Conventional Example 1 and Conventional Example 2 taken as the standard (100). A larger index value indicates more distance travelled and thus superior run-flat durability performance.

The steering stability performance evaluation test involved a sensory evaluation performed by an experienced driver on items including straight-running stability during forward motion, as well as turning stability, rigidity, and steering during lane changing and cornering, at speeds of from 60 km/h to 120 km/h on dry road surfaces, the test tires being inflated to the regular internal pressure and mounted on the test vehicle (a 2000 cc sport utility vehicle (SUV) made in Japan). The results based on the sensory evaluation were indexed with the results of Conventional Example 1 and Conventional Example 2 taken as the standard (100). In this evaluation, a larger index value indicates superior steering stability performance.

The rolling resistance reduction performance was carried out using an indoor drum testing machine to measure the resistance at a speed of 50 km/h of the test tires inflated to the regular internal pressure and loaded with 4 kN. The results based on the measurement results were indexed with the results of Conventional Example 1 and Conventional Example 2 taken as the standard (100). A larger index value indicates less rolling resistance and thus superior rolling resistance reduction performance. Note that for the working examples, an index value of 99 or greater is considered to indicate retention of rolling resistance reduction performance.

As shown in FIG. 3 and FIG. 4, the pneumatic tires of Conventional Example 1 and Conventional Example 2 have the relationship of the radius of curvature RO and the radius of curvature RP unspecified. In contrast to the pneumatic tire of Conventional Example 1, the pneumatic tires of Working Examples 1 to 12 have the relationship of the radius of curvature RO and the radius of curvature RP and other relationships specified. Additionally, in contrast to the pneumatic tire of Conventional Example 2, the pneumatic tires of Working Examples 13 to 23 have the relationship of the radius of curvature RO and the radius of curvature RP and other relationships specified.

As shown by the test results given in FIG. 3 and FIG. 4, the pneumatic tires of Working Examples 1 to 23 achieve both good run-flat durability performance and steering stability performance without the rolling resistance being degraded.

The invention claimed is:

1. A pneumatic tire comprising:
a reinforcing rubber layer disposed in sidewall portions on both sides in a tire width direction, the reinforcing rubber layer having a substantially crescent-like meridian cross-section; wherein
when the tire is assembled on a regular rim and in an unloaded state with an internal pressure of 0 kPa,
a radius of curvature RP is larger than a radius of curvature RO, an arc of the radius of curvature RP joining an intersection Pa of a carcass layer and a straight line La, an intersection Pb of the carcass layer and a straight line Lb, and an intersection Pc of the carcass layer and a straight line Lc, and an arc of the radius of curvature RO joining an intersection Oa of the straight line La and a tire side profile, an intersection Ob of the straight line Lb and the tire side profile, and an intersection Oc of the straight line Lc and the tire side profile, where
the straight line Lc is a straight line orthogonal to a tire equatorial plane at a portion of the tire with a maximum width when viewed in a meridian cross section,
the straight line La is a straight line from an intersection of the straight line Lc and the tire equatorial plane inclined by 10° outward in a tire radial direction with respect to the straight line Lc,
the straight line Lb is a straight line from the intersection of the straight line Lc and the tire equatorial plane inclined by 10° inward in the tire radial direction with respect to the straight line Lc,
a relationship between the radius of curvature RO and the radius of curvature RP satisfies: RO×1.2≤RP≤RO×2.5, and
the tire side profile is defined as a profile that smoothly formed by connecting a bead profile and a shoulder profile of the pneumatic tire and excluding any protection bars, patterns or letters provided on an outer surface of the pneumatic tire.

2. The pneumatic tire according to claim 1, further comprising:
a bead core;
the carcass layer being folded back at a position of the bead core from an inner side in the tire width direction outward in the tire width direction;
a bead filler disposed in space formed by an end of the carcass layer in the tire width direction being folded back at the position of the bead core; and
another reinforcing rubber layer disposed outside a folded back portion of the carcass layer in the tire width direction
wherein the another reinforcing rubber layer is disposed within the sidewall portion and is formed of rubber material that has a strength greater than that of the reinforcing rubber layer of the sidewall portions.

3. The pneumatic tire according to claim 2, wherein:
the folded back portion of the carcass layer contacts with a main body of the carcass layer; and
the folded back portion is sandwiched between one of the reinforcing rubber layers and the another reinforcing rubber layer at a self-contact portion of the carcass layer.

4. The pneumatic tire according to claim 3, wherein the folded back portion is sandwiched between the bead filler and the another reinforcing rubber layer.

5. The pneumatic tire according to claim 2, wherein the folded back portion is sandwiched between the bead filler and the another reinforcing rubber layer.

6. The pneumatic tire according to claim 1, wherein a portion of the tire side profile between the intersection Oa and the intersection Oc is a single arc.

7. A pneumatic tire comprising:
a reinforcing rubber layer disposed in sidewall portions on both sides in a tire width direction, the reinforcing rubber layer having a substantially crescent-like meridian cross-section; wherein
when the tire is assembled on a regular rim and in an unloaded state with an internal pressure of 0 kPa,
a radius of curvature RP is larger than a radius of curvature RO, an arc of the radius of curvature RP joining an intersection Pa of a carcass layer and a straight line La, an intersection Pb of the carcass layer and a straight line Lb, and an intersection Pc of the carcass layer and a straight line Lc, and an arc of the radius of curvature RO joining an intersection Oa of the straight line La and a tire side profile, an intersection Ob of the straight line Lb and the tire side profile, and an intersection Oc of the straight line Lc and the tire side profile, where
the straight line Lc is a straight line orthogonal to a tire equatorial plane at a portion of the tire with a maximum width when viewed in a meridian cross section,
the straight line La is a straight line from an intersection of the straight line Lc and the tire equatorial plane inclined by 10° outward in a tire radial direction with respect to the straight line Lc,
the straight line Lb is a straight line from the intersection of the straight line Lc and the tire equatorial plane inclined by 10° inward in the tire radial direction with respect to the straight line Lc,
the radius of curvature RP is from 60 mm to 120 mm, both inclusive, and
the tire side profile is defined as a profile that smoothly formed by connecting a bead profile and a shoulder profile of the pneumatic tire and excluding any protection bars, patterns or letters provided on an outer surface of the pneumatic tire.

8. A pneumatic tire comprising:
a reinforcing rubber layer disposed in sidewall portions on both sides in a tire width direction, the reinforcing rubber layer having a substantially crescent-like meridian cross-section; wherein
when the tire is assembled on a regular rim and in an unloaded state with an internal pressure of 0 kPa,
a radius of curvature RP is larger than a radius of curvature RO, an arc of the radius of curvature RP joining an intersection Pa of a carcass layer and a straight line La, an intersection Pb of the carcass layer and a straight line Lb, and an intersection Pc of the carcass layer and a straight line Lc, and an arc of the radius of curvature RO joining an intersection Oa of the straight line La and a tire side profile, an intersection Ob of the straight line Lb and the tire side profile, and an intersection Oc of the straight line Lc and the tire side profile, where
the straight line Lc is a straight line orthogonal to a tire equatorial plane at a portion of the tire with a maximum width when viewed in a meridian cross section,
the straight line La is a straight line from an intersection of the straight line Lc and the tire equatorial plane inclined by 10° outward in a tire radial direction with respect to the straight line Lc,
the straight line Lb is a straight line from the intersection of the straight line Lc and the tire equatorial plane inclined by 10° inward in the tire radial direction with respect to the straight line Lc,
a relationship between a cross-sectional width Aip and a cross-sectional width Apo satisfies: Apo<Aip, where
the cross-sectional width Aip is a cross-sectional width from an intersection Ia of the straight line La and a tire internal contour to the intersection Pa of the straight line La and the carcass layer, within which the reinforcing rubber layer is disposed,
the cross-sectional width Apo is a cross-sectional width from the intersection Pa to the intersection Oa of the straight line La and the tire side profile,
the relationship between the cross-sectional width Aip and the cross-sectional width Apo satisfies: Apo×1.5≤Aip≤Apo×6.0, and the cross-sectional width Aip is from 5.0 mm to 12.0 mm, both inclusive, and
the tire side profile is defined as a profile that smoothly formed by connecting a bead profile and a shoulder profile of the pneumatic tire and excluding any protection bars, patterns or letters provided on an outer surface of the pneumatic tire.

9. A pneumatic tire comprising:
a reinforcing rubber layer disposed in sidewall portions on both sides in a tire width direction, the reinforcing rubber layer having a substantially crescent-like meridian cross-section; wherein
when the tire is assembled on a regular rim and in an unloaded state with an internal pressure of 0 kPa,
a radius of curvature RP is larger than a radius of curvature RO, an arc of the radius of curvature RP joining an intersection Pa of a carcass layer and a straight line La, an intersection Pb of the carcass layer and a straight line Lb, and an intersection Pc of the carcass layer and a straight line Lc, and an arc of the radius of curvature RO joining an intersection Oa of the straight line La and a tire side profile, an intersection Ob of the straight line Lb and the tire side profile, and an intersection Oc of the straight line Lc and the tire side profile, where
the straight line Lc is a straight line orthogonal to a tire equatorial plane at a portion of the tire with a maximum width when viewed in a meridian cross section,
the straight line La is a straight line from an intersection of the straight line Lc and the tire equatorial plane inclined by 10° outward in a tire radial direction with respect to the straight line Lc,
the straight line Lb is a straight line from the intersection of the straight line Lc and the tire equatorial plane inclined by 10° inward in the tire radial direction with respect to the straight line Lc,
a relationship between a cross-sectional width Aip and a cross-sectional width Apo satisfies: Aip<Apo, where
the cross-sectional width Aip is a cross-sectional width from an intersection Ia of the straight line La and a tire internal contour to the intersection Pa of the straight line La and the carcass layer, within which the reinforcing rubber layer is disposed,
the cross-sectional width Apo is a cross-sectional width from the intersection Pa to the intersection Oa of the straight line La and the tire side profile,
the relationship between the cross-sectional width Aip and the cross-sectional width Apo satisfies: Apo×0.5≤Aip≤Apo×0.9, and the cross-sectional width Aip is from 3.0 mm to 9.0 mm, both inclusive, and
the tire side profile is defined as a profile that smoothly formed by connecting a bead profile and a shoulder profile of the pneumatic tire and excluding any protection bars, patterns or letters provided on an outer surface of the pneumatic tire.

10. A pneumatic tire comprising:
a reinforcing rubber layer disposed in sidewall portions on both sides in a tire width direction, the reinforcing rubber layer having a substantially crescent-like meridian cross-section; wherein
when the tire is assembled on a regular rim and in an unloaded state with an internal pressure of 0 kPa,
a radius of curvature RP is larger than a radius of curvature RO, an arc of the radius of curvature RP joining an intersection Pa of a carcass layer and a straight line La, an intersection Pb of the carcass layer and a straight line Lb, and an intersection Pc of the carcass layer and a straight line Lc, and an arc of the radius of curvature RO joining an intersection Oa of the straight line La and a tire side profile, an intersection Ob of the straight line Lb and the tire side profile, and an intersection Oc of the straight line Lc and the tire side profile, where
the straight line Lc is a straight line orthogonal to a tire equatorial plane at a portion of the tire with a maximum width when viewed in a meridian cross section,
the straight line La is a straight line from an intersection of the straight line Lc and the tire equatorial plane inclined by 10° outward in a tire radial direction with respect to the straight line Lc,
the straight line Lb is a straight line from the intersection of the straight line Lc and the tire equatorial plane inclined by 10° inward in the tire radial direction with respect to the straight line Lc,
a relationship between a cross-sectional width Aip, a cross-sectional width Apo, a cross-sectional width Bip, and a cross-sectional width Bpo satisfies: Bip/Bpo<Aip/Apo≤Bip/Bpo×5.0, where the cross-sectional width Aip is a cross-sectional width from an intersection Ia of the straight line La and a tire internal contour to the intersection Pa of the straight line La and the carcass layer, within which the reinforcing rubber layer is disposed, the cross-sectional width Apo is a cross-sectional width from the intersection Pa to the intersection Oa of the straight line La and the tire side profile, the cross-sectional width Bip is a cross-sectional width from an intersection Ib of the straight line Lb and the tire internal contour to the intersection Pb of the straight line Lb and the carcass layer, within which the reinforcing rubber layer is disposed, the cross-sectional width Bpo is a cross-sectional width from the intersection Pb to the intersection Ob of the straight line Lb and the tire side profile, and the tire side profile is defined as a profile that smoothly formed by connecting a bead profile and a shoulder profile of the pneumatic tire and excluding any protection bars, patterns or letters provided on an outer surface of the pneumatic tire.

11. The pneumatic tire according to claim 10, wherein carcass cords of the carcass layer are made from rayon.

* * * * *